United States Patent
Xia et al.

(10) Patent No.: US 10,448,417 B2
(45) Date of Patent: Oct. 15, 2019

(54) SYSTEM AND METHOD FOR DEVICE RANDOM ACCESS IN A BEAMFORMED COMMUNICATIONS SYSTEM

(71) Applicant: Futurewei Technologies, Inc., Plano, TX (US)

(72) Inventors: Pengfei Xia, San Diego, CA (US); Xiaocui Li, Beijing (CN); Bin Liu, San Diego, CA (US); Kai Xu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/625,403

(22) Filed: Jun. 16, 2017

(65) Prior Publication Data

US 2018/0368155 A1 Dec. 20, 2018

(51) Int. Cl.
| | |
|---|---|
| *H04W 72/12* | (2009.01) |
| *H04W 74/08* | (2009.01) |
| *H04W 24/10* | (2009.01) |
| *H04W 72/04* | (2009.01) |
| *H04W 16/28* | (2009.01) |

(52) U.S. Cl.
CPC ... *H04W 72/1231* (2013.01); *H04W 72/1289* (2013.01); *H04W 74/0808* (2013.01); *H04W 16/28* (2013.01); *H04W 24/10* (2013.01); *H04W 72/046* (2013.01)

(58) Field of Classification Search
CPC combination set(s) only.
See application file for complete search history.

(56) References Cited

U.S. PATENT DOCUMENTS

| | | |
|---|---|---|
| 9,088,988 B1 | 7/2015 | Park et al. |
| 9,609,527 B1 | 3/2017 | Tailor et al. |
| 2015/0131511 A1 | 5/2015 | Ghosh et al. |

(Continued)

FOREIGN PATENT DOCUMENTS

WO   2015149273 A1   10/2015

OTHER PUBLICATIONS

"Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications; High-speed Physical Layer in the 5 GHz Band," IEEE Std 802A 11a-1999(R2003), IEEE Computer Society, Jun. 12, 2003, 91 pages.

(Continued)

*Primary Examiner* — Dady Chery
(74) *Attorney, Agent, or Firm* — Slater Matsil, LLP (57) ABSTRACT

A method for communicating with an access node includes receiving measurement table information from the access node, wherein the measurement table information is derived from measurements of communications channels between access nodes and user equipments (UEs) served by the access nodes, determining an access strategy and an associated access parameter for a shared communications channel in accordance with the measurement table information, and transmitting an uplink transmission on the shared communications channel in accordance with the associated access parameter after obtaining access to the shared communications channel.

21 Claims, 7 Drawing Sheets

(56) References Cited

U.S. PATENT DOCUMENTS

2017/0331670 A1* 11/2017 Parkvall .............. H04J 11/0079

OTHER PUBLICATIONS

"IEEE Standard for Information Technology—Telecommunications and information exchange between systems—Local and metropolitan area networks—Specifics requirements; Part 11: Wireless LAN Medium Access Control (MAC) and Physical Layer (PHY) specifications; Amendment 8: Medium Access Control (MAC) Quality of Service Enhancements," IEEE Computer Society, IEEE Std 802.11e, Nov. 11, 2005, 211 pages.

* cited by examiner

| 550 | TIME 1 | TIME 2 | TIME 3 | TIME 4 | |
|---|---|---|---|---|---|
| ACCESS NODE A SCHEDULING | A(1) | A(2) | A(3) | A(4) | 555 |
| ACCESS NODE B SCHEDULING | B(1) | B(2) | B(3) | B(4) | |
| UE1 I.C.O. ACCESS NODE A 564 | 1 562 | 0 566 | 0 | 1 | |
| UE1 I.C.O. ACCESS NODE B | 0 | 0 | 1 | 1 | |
| UE1 I.C.O. BOTH ACCESS NODES 568 | 0 | 0 | 0 | 1 | 560 |
| UE2 I.C.O. ACCESS NODE A | 1 | 1 | 0 | 0 | |
| UE2 I.C.O. ACCESS NODE B | 0 | 1 | 1 | 0 | |
| UE2 I.C.O. ACCESS NODES | 0 | 1 | 0 | 0 | |

SYSTEM AND METHOD FOR DEVICE RANDOM ACCESS IN A BEAMFORMED COMMUNICATIONS SYSTEM

TECHNICAL FIELD

The present disclosure relates generally to a system and method for digital communications, and, in particular embodiments, to a system and method for device random access in a beamformed communications system.

BACKGROUND

Future wireless communications systems are operating at ever higher carrier frequencies in a quest to find greater bandwidth and less interference. These wireless communications systems may operate at frequencies of 6 GHz and above, millimeter wavelength (mmWave) frequencies, for example, to exploit greater available bandwidth and less interference then what is available at the congested lower frequencies. However, pathloss is a significant issue. Beamforming may be used to overcome the high pathloss.

SUMMARY

Example embodiments provide a system and method for device random access in a beamformed communications system.

In accordance with an example embodiment, a method for communicating with an access node is provided. The method includes receiving, by a user equipment (UE), measurement table information from the access node, wherein the measurement table information is derived from measurements of communications channels between access nodes and UEs served by the access nodes, determining, by the UE, an access strategy and an associated access parameter for a shared communications channel in accordance with the measurement table information, and transmitting, by the UE, an uplink transmission on the shared communications channel in accordance with the associated access parameter after obtaining access to the shared communications channel.

Optionally, in any of the preceding embodiments, the method further comprises receiving, by the UE, communications beam scheduling information from the access node, wherein the access strategy is also determined in accordance with the communications beam scheduling information.

Optionally, in any of the preceding embodiments, wherein the measurement table information includes at least one of indications of communications beams of the access node, indications of communications of neighboring access nodes detectable by UEs served by the access node, indications of communications beams of the UEs served by the access node, indications of communications beams of the UEs served by the access node detectable by the neighboring access nodes.

Optionally, in any of the preceding embodiments, wherein determining the access strategy comprises determining, by the UE, a value for the associated access parameter in accordance with a transmission probability.

Optionally, in any of the preceding embodiments, wherein the associated access parameter comprises one or more of a listen before talk (LBT) threshold, a contention window size, wait time before contention, or a carrier sense multiple access (CSMA) threshold.

In accordance with an example embodiment, a method for communicating with a UE is provided. The method includes generating, by an access node, measurement table information in accordance with channel measurements of communications channels between the access node and UEs served by the access node, signaling, by the access node, the measurement table information to the UEs served by the access node, and receiving, by the access node, an uplink transmission from the UE on a shared communications channel.

Optionally, in any of the preceding embodiments, wherein generating the measurement table information comprises deriving, by the access node, the measurement table information from measurement reports received from the UEs served by the access node.

Optionally, in any of the preceding embodiments, wherein generating the measurement table information comprises measuring, by the access node, the communications channels in accordance with signals received from the UEs served by the access node, and deriving, by the access node, the measurement table information from the measurements of the communications channels.

Optionally, in any of the preceding embodiments, wherein the method further comprises signaling, by the access node, communications beam scheduling information to the UEs served by the access node.

Optionally, in any of the preceding embodiments, wherein the method further comprises sharing, by the access node, the measurement table information with neighboring access nodes.

Optionally, in any of the preceding embodiments, wherein sharing the measurement table information comprises sending, by the access node, the measurement table information to the neighboring access nodes, receiving, by the access node, neighboring measurement table information from the neighboring access nodes, and updating, by the access node, the measurement table information in accordance with the neighboring measurement table information.

In accordance with an example embodiment, a UE is provided. The UE includes one or more processors, and a computer readable storage medium storing programming for execution by the one or more processors. The programming including instructions to configure the UE to receive measurement table information from an access node, wherein the measurement table information is derived from measurements of communications channels between access nodes and UEs served by the access nodes, determine an access strategy and an associated access parameter for a shared communications channel in accordance with the measurement table information, and transmit an uplink transmission on the shared communications channel in accordance with the associated access parameter after obtaining access to the shared communications channel.

Optionally, in any of the preceding embodiments, wherein the programming includes instructions to configure the UE to receive communications beam scheduling information from the access node, and wherein the access strategy is also determined in accordance with the communications beam scheduling information.

Optionally, in any of the preceding embodiments, wherein the programming includes instructions to configure the UE to determine a value for the associated access parameter in accordance with a transmission probability.

Optionally, in any of the preceding embodiments, wherein the measurement table information includes at least one of indications of communications beams of the access node, indications of communications of neighboring access nodes detectable by UEs served by the access node, indications of communications beams of the UEs served by the access node, indications of communications beams of the UEs served by the access node detectable by the neighboring access nodes.

In accordance with an example embodiment, an access node is provided. The access node includes one or more processors, and a computer readable storage medium storing programming for execution by the one or more processors. The programming including instructions to configure the access node to generate measurement table information in accordance with channel measurements of communications channels between the access node and UEs served by the access node, signal the measurement table information to the UEs served by the access node, and receive an uplink transmission from the UE on a shared communications channel.

Optionally, in any of the preceding embodiments, wherein the programming includes instructions to configure the access node to derive the measurement table information from measurement reports received from the UEs served by the access node.

Optionally, in any of the preceding embodiments, wherein the programming includes instructions to configure the access node to measure the communications channels in accordance with signals received from the UEs served by the access node, and derive the measurement table information from measurements of the communications channels.

Optionally, in any of the preceding embodiments, wherein the programming includes instructions to configure the access node to signal communications beam scheduling information to the UEs served by the access node.

Optionally, in any of the preceding embodiments, wherein the programming includes instructions to configure the access node to share the measurement table information with neighboring access nodes.

Optionally, in any of the preceding embodiments, wherein the programming includes instructions to configure the access node to send the measurement table information to the neighboring access nodes, receive neighboring measurement table information from the neighboring access nodes, and update the measurement table information in accordance with the neighboring measurement table information.

Practice of the foregoing embodiments enables user equipment operating in a beamforming environment to randomly access a shared communications channel based on signal measurement information and communications beam information that are collaboratively obtained. The use of the signal measurement information and communications beam information helps to reduce interference caused by the random access transmissions of the user equipment.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
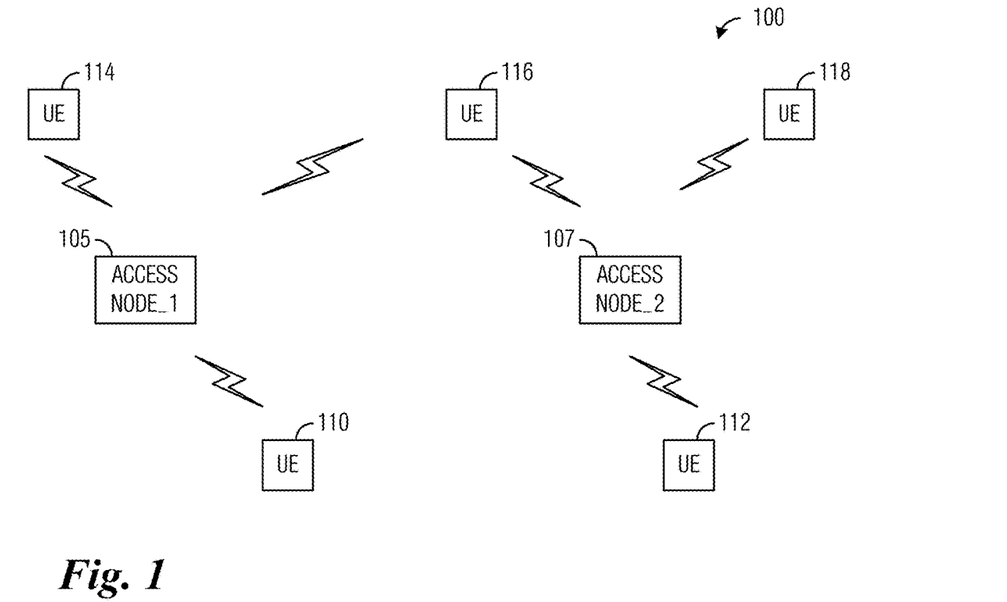
FIG. 1 illustrates an example wireless communications system according to example embodiments described herein.

FIG. 1 illustrates an example wireless communications system 100. Communications system 100 includes a first access node (access node_1) 105 and a second access node (access node_2) 107, as well as a plurality of user equipments (UEs), such as UE no, UE 112, UE 114, UE 116, and UE 118. In one communications mode commonly referred to as cellular mode, communications intended for or originating from a UE pass through an access node serving the UE. In another communications mode commonly referred to as random access, a UE with a transmission to make can randomly access a shared communications channel and make the transmission as long as the UE has checked the status of the shared communications channel and has determined that the shared communications channel is not occupied by another transmitting device.

Access nodes are also commonly referred to as NodeBs, evolved NodeBs (eNBs), next generation (NG) NodeBs (gNBs), master eNBs (MeNBs), secondary eNBs (SeNBs), master gNBs (MgNBs), secondary gNBs (SgNBs), base stations, access points, remote radio heads, and so on. Similarly, UEs are also commonly referred to as mobiles, mobile stations, stations, terminals, subscribers, users, and the like. While it is understood that communications systems may employ multiple access nodes capable of communicating with a number of UEs, only two access nodes, and five UEs are illustrated for simplicity.

In non-beamformed communications systems, when a device has a transmission to make on a shared communications channel (which may be on an unlicensed carrier), the device usually needs to perform a listen-before-talk procedure before making the transmission. The listen-before-talk procedure (sometimes referred to as a listen-before-transmit procedure) typically involves the device sensing its radio environment to determine if the shared communications channel is idle before the device commences its transmission. If the detected energy on the shared communications channel is below a specified threshold, the device determines that the shared communications channel is idle and may proceed with its transmission. If the detected energy on the shared communications channel is above the specified threshold, the device determines that the shared communications channel is busy and holds its transmission. IEEE 802.11 (Wi-Fi) compliant communications use a variation of listen-before-talk referred to as carrier sense multiple access with collision detect (CSMA/CD) where a Wi-Fi station senses the state of the shared communications channel to determine if the shared communications channel is idle before transmitting.

Figure 2:
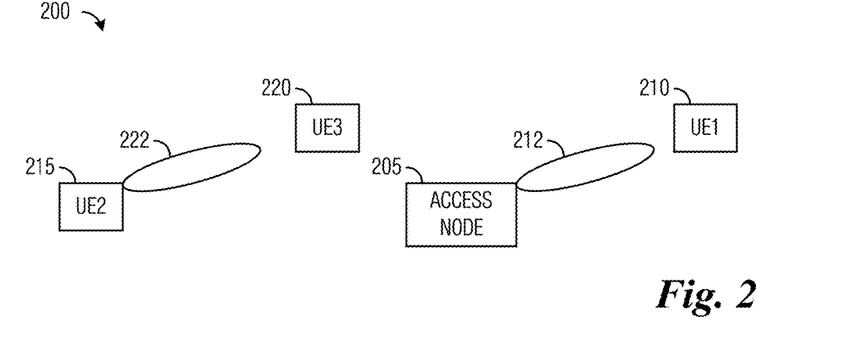
FIG. 2 illustrates a beamformed communications system highlighting the insufficiency of listen-before-talk.

Legacy communications systems supporting listen-before-talk random access normally support devices that receive using omnidirectional receive antennas. However, in a beamformed communications system, where devices communicate using directional communications beams, listen-before-talk may be insufficient in preventing transmission collisions. FIG. 2 illustrates a beamformed communications system 200 highlighting the insufficiency of listen-before-talk. Beamformed communications system 200 includes an access node 205 making a transmission to a first UE (UE1) 210 using transmit beam 212. While access node 205 is transmitting to UE1 210, a second UE (UE2) 215 has a transmission intended for a third UE (UE3) 220. Therefore, UE2 215 performs a listen-before-talk procedure using receive beam 222. Because transmit beam 212 is directed away from UE2 215 and because UE2 215 is using receive beam 222 to perform the listen-before-talk procedure, it is very likely that UE2 215 is unable to detect the transmission taking place between access node 205 and UE1 210. Hence, the detected energy level on the shared communications channel may be below the specified threshold and the shared communications channel is deemed to be idle. Therefore, UE2 215 is free to transmit to UE3 220 using a transmit beam that corresponds to receive beam 222. The transmission may cause interference to the transmission taking place between access node 205 and UE1 210.

Therefore, there is a need for systems and methods for supporting transmitting device random access in a beamformed communications system.

According to an example embodiment, a system and method for supporting transmitting device random access in a beamformed communications system utilizing signal measurement information is provided. A transmitting device, such as a UE, uses the signal measurement information to determine an access strategy for randomly accessing the shared communications channel without causing undue interference to other devices operating in the vicinity. Determination of the access strategy also includes determining associated access parameters of the access strategy. The signal measurement information indicates which receive beam of a first device is capable of detecting a transmitted signal from a second device, for example. An access node (or a network entity maintaining the signal measurement information) may provide the signal measurement information to the transmitting device. Examples of access parameters include contention window sizes, listen-before-talk thresholds, CSMA thresholds, minimum wait time before contention, maximum wait time before contention, wait time before contention, and so on.

The signal measurement information may be in the form of single-bit values indicating if a particular receive beam of a first device is able to detect a transmitted signal from a second device. Alternatively, the signal measurement information may be in the form of multiple-bit values indicating a quantized received signal strength of a transmitted signal from a second device received by a particular receive beam of a first device. Alternatively, the signal measurement information may be in the form of a received signal strength of a transmitted signal from a second device received by a particular receive beam of a first device. The examples of the signal measurement information presented herein are for illustrative purposes only and are not intended to be limiting to either the scope or the spirit of the example embodiments.

According to an example embodiment, a system and method for supporting transmitting device random access in a beamformed communications system utilizing collaboratively gathered signal measurement information and communications beam scheduling information is used to support device random access in a beamformed communications system. A transmitting device, such as a UE, uses the signal measurement information and communications beam scheduling information to determine an access strategy for randomly accessing the shared communications channel, as well as associated access parameters therefor, without causing undue interference to other devices operating in the vicinity. The communications beam scheduling information indicates a time, a time interval, a time slot, and so forth, that a first device will be using a particular communications beam to transmit (using the particular transmit beam) to a second device or to receive (using the particular receive beam) from a second device, for example. An access node (or a network entity maintaining the communications beam scheduling information) may provide the communications beam scheduling information to the transmitting device.

The communications beam scheduling information may be in the form of a sequence of communications beams of a first device and a time, time interval, time slot, and so forth, for each communications beam indicating when the first device will use the communications beam. Alternatively, communications beam scheduling information may be in the form of a sequence of communications beams of a first device with the ordering of the sequence implicitly indicating when the first device will use the communications beam. As an illustrative example, if the communications beam scheduling information comprises sequence: 2, 4, 1, 3, then communications beam 2 will be used in a first time slot or interval, then communications beam 4 will be used in a second time slot or interval, followed by communications beam 1 in a third time slot or interval and communications beam 3 in a fourth time slot or interval. The examples of the communications beam scheduling information presented herein are for illustrative purposes only and are not intended to be limiting to either the scope or the spirit of the example embodiments.

For discussion purposes, the following communications system deployment is utilized:

The communications system includes a plurality of access nodes, denoted A, B, C, and so on, and a plurality of UEs, denoted UE_1, UE_2, UE_3, and so forth.

Each UE is served by a particular access node. As an example, UE_1 is served by access node B, which is a neighbor of access node A.

Each access node supports beamforming in both transmission and reception. As an example, the beams of access node A are denoted beams A(i), i=1, . . . , NA, where NA is the number of communications beams of access node A. Similarly, the beams of access node B are denoted beams B(i), i=1, . . . , NB, where NB is the number of communications beams of access node A.

For simplicity, the beams of an access node may be used for transmitting and receiving. The situation where an access node has different transmit and receive beam configurations are also supported by the example embodiments presented herein but are not considered in this discussion to maintain simplicity.

For simplicity, the UEs utilize omnidirectional transmissions. The situation where a UE uses beamformed transmissions is also supported by the example embodiments presented herein but is not considered in this discussion to maintain simplicity.

Beam calibration is used.

If a UE can detect a transmission from an access node transmitting with an i-th transmit beam, then the access node can detect a transmission from the UE using the i-th receive beam.

Figure 3:
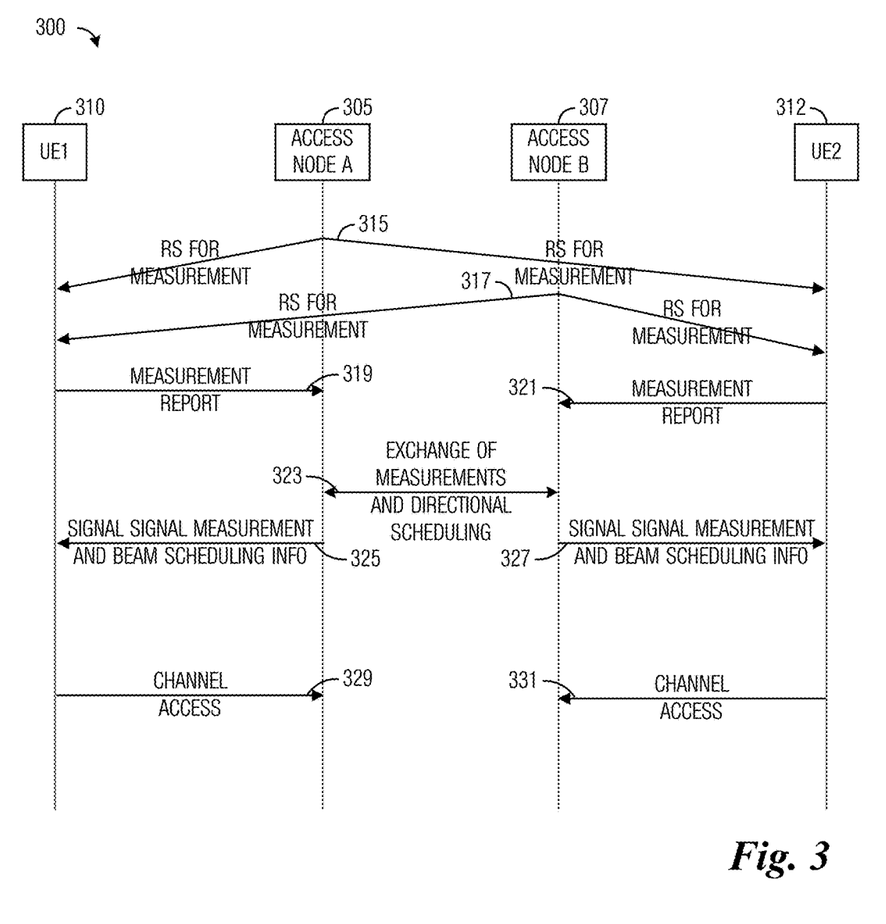
FIG. 3 illustrates a diagram of communications exchanged between devices participating in transmitting device random access in a beamformed communications system according to example embodiments described herein.

FIG. 3 illustrates a diagram 300 of communications exchanged between devices participating in transmitting device random access in a beamformed communications system. Diagram 300 displays communications exchanged between access nodes (access node A 305 and access node B 307) and UEs (UE1 310 and UE2 312) as the devices participate in transmitting device random access in a beamformed communications system.

In order to support signal measurements, some of the devices transmit beamformed signals (such as reference signals, measurement reference signals, normal transmissions, and so on) while other devices measure an amount of energy that they are able to detect on the communications channel while the signals are being transmitted. As shown in FIG. 3, access node A 305 transmits a beamformed reference signal (RS) in one or more network resources for measurement purposes (event 315), while UE1 310 and UE2 312 make measurements of detectable energy in the one or more network resources. The RS may broadcast by access node A 305 or the RS may be individually transmitted to UE1 310 and UE2 312. As an example, the RS may be addressed to a UE group that includes UE1 310 and UE2 312 or the RS may be addressed to UE1 310 and UE2 312 separately. Access node B 307 also transmits a beamformed RS in one or more network resources for measurement purposes (event 317), while UE1 310 and UE2 312 make measurements of detectable energy in the one or more network resources. The RS transmitted by access node A 305 may be the same as the RS transmitted by access node B 307. Alternatively, the access nodes may transmit different RSs. The access nodes may transmit their respective RSs simultaneously or separately, depending upon the capabilities of the UEs, for example.

Although FIG. 3 illustrates a situation where the access nodes transmit and the UEs measure (downlink channel measurements), a similar situation is possible where the UEs transmit and the access nodes measure (uplink channel measurements). In certain communications systems, such as those that use time division duplexing (TDD), uplink channel measurements and downlink channel measurements are substantially equal.

The UEs measure the amount of energy that they are able to detect in network resources used to convey the RS. Because the access nodes are using beamforming, in order to accurately assess the detectability of signals transmitted by the access nodes using different transmission beams, the access nodes should transmit the beamformed RS using each of their available transmission beams. This is referred to as beam sweeping. As an example, at a first time, access node A 305 transmits the beamformed RS using transmit beam A(1), at a second time, access node A 305 transmits the beamformed RS using transmit beam A(2), and so on, for all transmit beams of access node A 305. It is noted that in a situation where the UEs are using receive beams (i.e., the UE is also using beamforming), the dwell time of each beamformed RS transmission should be sufficiently long to allow the UE to detect the energy in the communications channel using each of its receive beams.

The UEs report the amount of energy detected for each of the transmit beams of each of the access nodes in measurement reports (events 319 and 321). In an embodiment, each UE reports the detected energies associated with all of the access nodes to a single access node (e.g., the access node serving the UE). In another embodiment, each UE reports the detected energies with each access node separately to each access node.

The access nodes exchange the information in the measurement reports and update their signal measurement information (event 323). The signal measurement information may be stored in tabular form. A discussion of an example tabular arrangement of the signal measurement information is presented below. The access nodes share the detected energies associated with their own transmissions, as well as detected energies associated with transmissions made by other access nodes, with neighboring access nodes. As shown in FIG. 3, access node A 305 receives a measurement report from UE1 310 that includes detected energies for beamformed RSs transmitted by both access node A 305 and access node B 307. Access node A 305 shares the detected energies with access node B 307. Similarly, access node B 307 receives a measurement report from UE2 312 that includes detected energies for beamformed RSs transmitted by both access node B 307 and access node A 305. Access node B 307 shares the detected energies with access node A 305.

In addition to the information in the measurement reports, the access nodes share communications beam scheduling information (event 323). The communications beam scheduling information indicates a time, a time interval, a time slot, and so forth, that an access node will be using a particular communications beam to transmit (using the particular transmit beam) to a device or to receive (using the particular receive beam) from a device, for example. As an example, the communications beam scheduling information of access node A 305 informs access node B 307 when access node A 305 will use a particular communications beam (either a transmit beam or a receive beam) to communicate. Access node B 307 may then schedule a transmission or a reception or to remain silent during that time to not cause interference to access node A 305 or receive interference from access node A 305.

The access nodes signal the signal measurement information to the UEs (events 325 and 327). The access nodes signal the signal measurement information to the UEs that they serve. In an embodiment, the access nodes also signal the communications beam scheduling information to the UEs. The UEs determine an access strategy, as well as associated access parameters, in accordance with the signal measurement information and optionally, the communications beam scheduling information. The UEs perform channel access in accordance with their respective access strategy (events 329 and 331).

Figure 4:
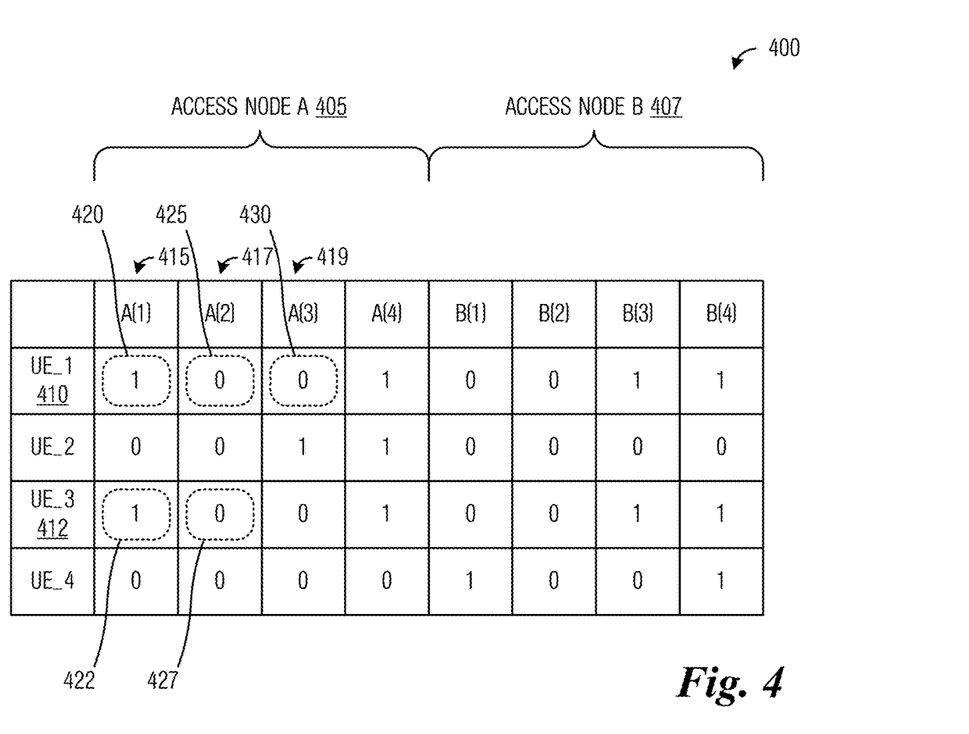
FIG. 4 illustrates an example arrangement of signal measurement information according to example embodiments described herein.

FIG. 4 illustrates an example arrangement of signal measurement information 400. Signal measurement information 400 is arranged in tabular form. Other arrangements of the signal measurement information are possible. As shown in FIG. 4, signal measurement information 400 includes information for communications beams of two access nodes, access node A 405 and access node B 407. Access node A 405 has four communications beams (A(1), . . . , A(4)) and access node B 407 has four communications beams (B(1), . . . , B(4)). Each communications beam of the two access nodes is represented as columns of the table. As an example, column 415 corresponds to communications beam A(1), column 417 corresponds to communications beam A(2), and column 419 corresponds to communications beam A(3), and so on.

Signal measurement information 400 includes detected signal strength values for four UEs, including UE1 410, and UE3 412, with a first value (e.g., "1") representing a detected signal strength that exceeds a specified threshold and a second value (e.g., "0") representing a detected signal strength that does not exceed the specified threshold. As an example, value 420 represents that the signals detected by UE1 410 for a transmission made on communications beam A(1) (i.e., transmit beam A(1)) by access node A 405 exceeded the specified threshold. Similarly, value 422 represents that the signals detected by UE3 412 for a transmission made on communications beam A(1) by access node A 405 exceeded the specified threshold. However, values 425 and 427 represent that the signals detected by UE1 410 and UE3 412 for transmissions made on communications beam A(2) of access node A 405 do not exceed the specified threshold. Furthermore, value 430 represents that the signals detected by UE1 410 for a transmission made on communications beam A(3) of access node A 405 does not exceed the specified threshold.

Conversely, the detected signal strength values represent that detected signals corresponding to a transmission made by a particular UE as received by a communications beam (i.e., a receive beam) meets (e.g., value="1") or does not meet (e.g., value="0") the specified threshold. As an example, value 420 represents that signals from UE1 410, as detected by communications beam A(1) of access node A 405, exceed the specified threshold, while value 425 represents that signals from UE1 410, as detected by communications beam A(2) of access node A 405, does not exceed the specified threshold. Therefore, for a UE and access node pairing associated with a particular entry in signal measurement information 400 that is equal to "1", then when the UE is transmitting to a nearby device, the transmission from the UE will cause interference to the access node.

It is noted that the discussion of signal measurement information 400 presents a configuration where a one-bit value (either 1 or 0) is used to represent if the detected signals meet a threshold. Other configurations are possible. As an illustrative example, a multi-bit value is used to represent the detected signals. In such a configuration, a first value may indicate that the detected signal does not meet a threshold, while a plurality of values may indicate a magnitude of how much the detected signal exceeds the threshold. For example, a two-bit value is used, where value "00" represents the detected signal not meeting the threshold, value "01" represents the detected signal meeting the threshold by a small margin, value "10" represents the detected signal meeting the threshold by a medium margin, and value "11" represents the detected signal meeting the threshold by a large margin. The multi-valued signal measurement information may allow UEs to finely tune their access strategy. As an example, a UE may decide to go ahead with a high priority transmission even if the signal measurement information indicates that its transmission will cause a small amount of interference to other devices, while stopping a low priority transmission under the same circumstances.

Figure 5A:
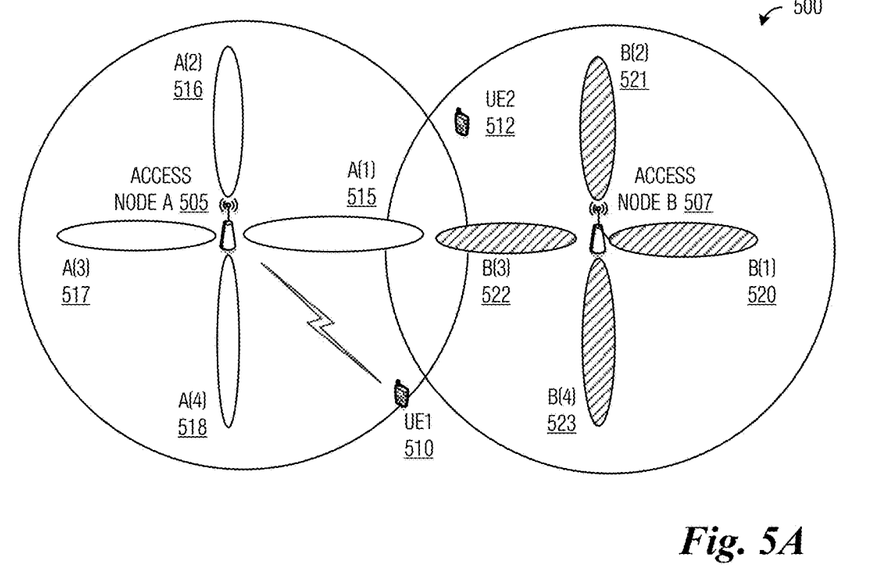
FIG. 5A illustrates a communications system highlighting a first example communications beam scenario according to example embodiments described herein.

FIG. 5A illustrates a communications system 500 highlighting a first example communications beam scenario. Communications system 500 includes an access node A 505 serving UE1 510, and an access node B 507 serving UE2 512. Access node A 505 and access node B 507 are neighboring access nodes. As shown in FIG. 5A, access node A 505 has four communications beams A(1) 515, A(2) 516, A(3) 517, and A(4) 518, while access node B 507 has four communications beams B(1) 520, B(2) 521, B(3) 522, and B(4) 523. The access nodes communicate using their respective communications beams in an order as shown. UE1 510 is located at the coverage edge of access node A 505 and spatially between communications beams A(1) 515 and A(4) 518, while UE2 512 is located at the coverage edge of access node B 507 and spatially between communications beams B(2) 521 and B(3) 522.

Figure 5B:
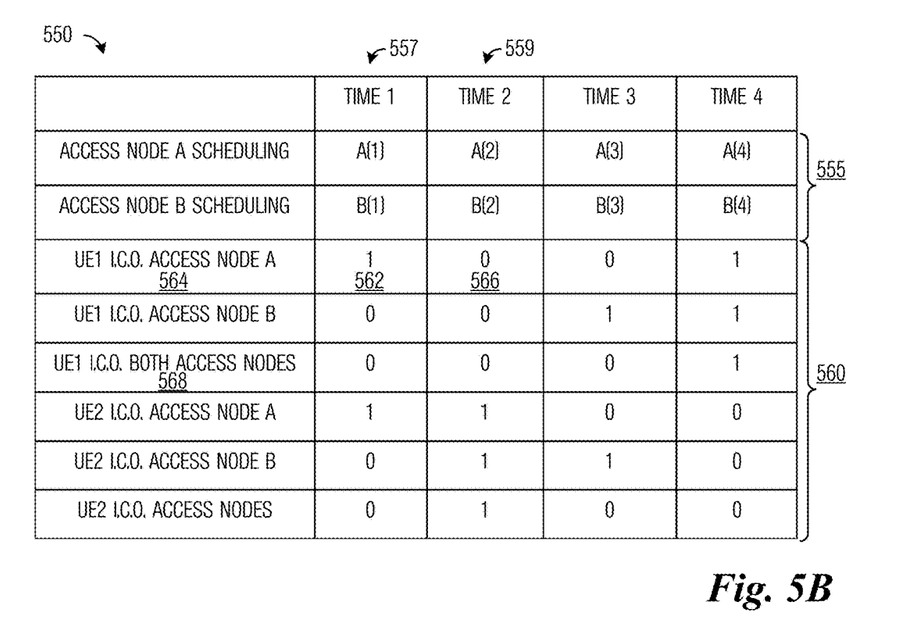
FIG. 5B illustrates a first example arrangement of signal measurement and communications beam scheduling information according to example embodiments described herein.

FIG. 5B illustrates a first example arrangement 550 of signal measurement and communications beam scheduling information. Arrangement 550 includes both signal measurement information and communications beam scheduling information. Arrangement 550 is presented in tabular form, but other arrangements are possible.

Arrangement 550 includes a first portion 555 that includes communications beam scheduling information. The columns of arrangement 550 correspond to times, time intervals, time slots, and so on, associated with the communications beams. As an example, with respect to first portion 555, column 557 corresponds to a first time, when access node A 505 is communicating using communications beam A(1) and access node B 507 is communicating using communications beam B(1), while column 559 corresponds to a second time, when access node A 505 is communicating using communications beam A(2) and access node B 507 is communicating using communications beam B(2), and so on.

Arrangement 550 includes a second portion 560 that includes signal measurement information. The columns of arrangement 550 correspond to times, time intervals, time slots, and so on, associated with the communications beams. As an example, with respect to second portion 560, column 557 corresponds to a first time, when a particular access node communicates using a first communications beam, while column 559 corresponds to a second time, when the particular access node communicates using a second communications beam. A value in a cell of arrangement 550 corresponds to a particular time (associated with a particular column of the cell) and one or more access nodes (associated with a particular row of the cell) and indicates if a transmission made by the UE will be detectable by the one or more access nodes. As an illustrative example, cell 562 represents signal measurement information for UE1 510 for a first time (column 557) and access node A 505 (row 564). As shown in FIG. 5B, cell 562 has value "1" representing that a transmission by UE1 510 would be detectable by access node A 505, while cell 566 has a value "0" representing that a transmission by UE1 510 would not be detectable by access node A 505. Similarly, cell 562 represents that a transmission by access node A 505 would be detectable by UE1 510 at the first time, while cell 566 represents that a transmission by access node A 505 would not be detectable by UE 510 at the second time. Row 568 presents signal measurement information for UE1 510 I.C.O. both access nodes A 505 and B 507. The values of cells of in row 568 are basically a logical AND operation of the values of cells associated with UE1 510 and the individual access nodes.

Figure 6A:
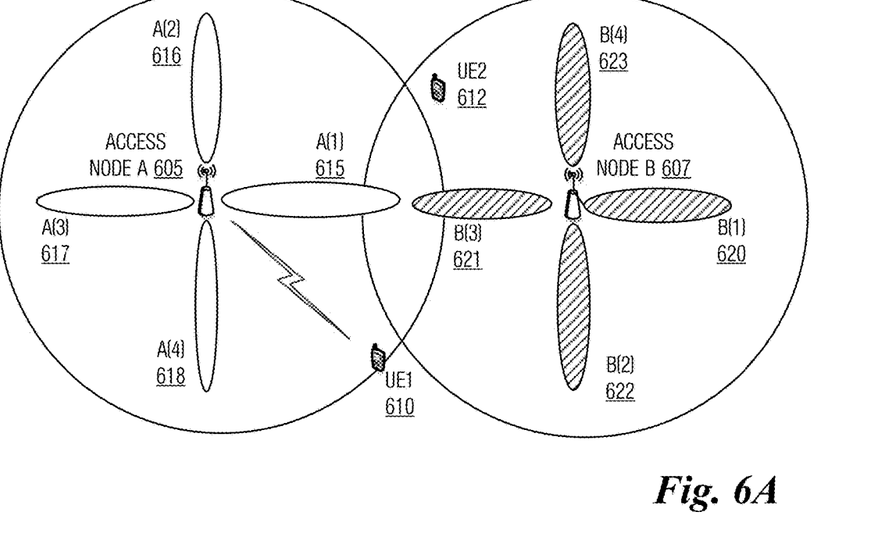
FIG. 6A illustrates communications system highlighting a second example communications beam scenario according to example embodiments described herein.

FIG. 6A illustrates communications system 600 highlighting a second example communications beam scenario. Communications system 600 includes an access node A 605 serving UE1 610, and an access node B 607 serving UE2 612. Access node A 605 and access node B 607 are neighboring access nodes. As shown in FIG. 6A, access node A 605 has four communications beams A(1) 615, A(2) 616, A(3) 617, and A(4) 618, while access node B 607 has four communications beams B(1) 620, B(3) 621, B(2) 622, and B(4) 623. The access nodes communicate using their respective communications beams in an order as shown. UE1 610 is located at the coverage edge of access node A 605 and spatially between communications beams A(1) 615 and A(4) 618, while UE2 612 is located at the coverage edge of access node B 607 and spatially between communications beams B(4) 623 and B(3) 621.

Figure 6B:
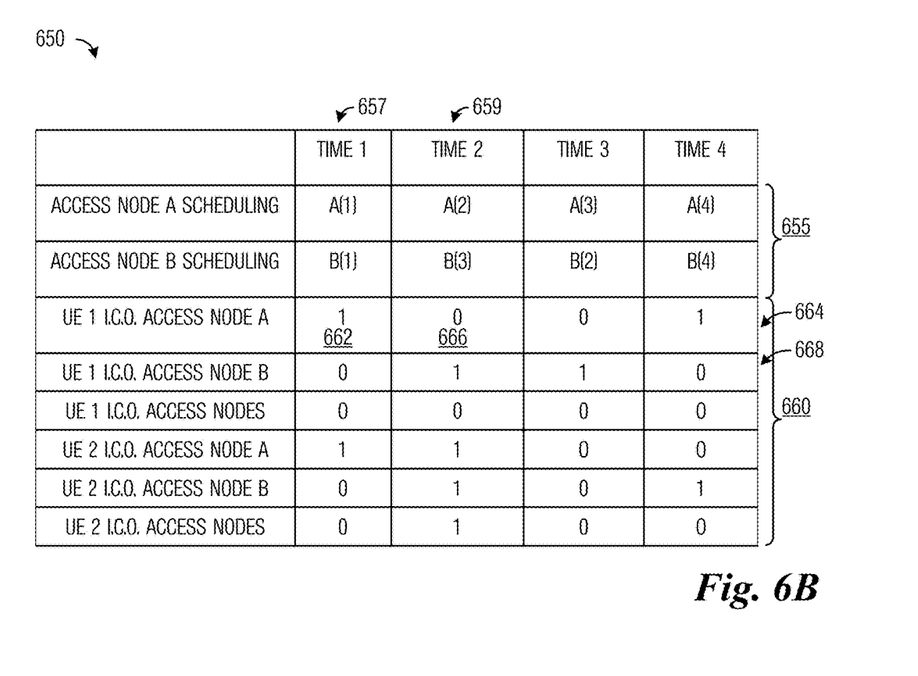
FIG. 6B illustrates a second example arrangement of signal measurement and communications beam scheduling information according to example embodiments described herein.

FIG. 6B illustrates a second example arrangement 650 of signal measurement and communications beam scheduling information. Arrangement 650 includes both signal measurement information and communications beam scheduling information. Arrangement 550 is presented in tabular form, but other arrangements are possible.

Arrangement 650 includes a first portion 655 that includes communications beam scheduling information. The columns of arrangement 650 correspond to times, time intervals, time slots, and so on, associated with the communications beams. As an example, with respect to first portion 655, column 657 corresponds to a first time, when access node A 605 is communicating using communications beam A(1) and access node B 607 is communicating using communications beam B(1), while column 659 corresponds to a second time, when access node A 605 is communicating using communications beam A(2) and access node B 607 is communicating using communications beam B(3), and so on.

Arrangement 650 includes a second portion 660 that includes signal measurement information. The columns of arrangement 650 correspond to times, time intervals, time slots, and so on, associated with the communications beams. As an example, with respect to second portion 660, column 657 corresponds to a first time, when a particular access node communicates using a first communications beam, while column 659 corresponds to a second time, when the particular access node communicates using a second communications beam. A value in a cell of arrangement 650 corresponds to a particular time (associated with a particular column of the cell) and one or more access nodes (associated with a particular row of the cell) and indicates if a transmission made by the UE will be detectable by the one or more access nodes. As an illustrative example, cell 662 represents signal measurement information for UE1 610 for a first time (column 657) and access node A 605 (row 664). As shown in FIG. 6B, cell 662 has value "1" representing that a transmission by UE1 610 would be detectable by access node A 605, while cell 666 has a value "0" representing that a transmission by UE1 610 would not be detectable by access node A 605. Similarly, cell 662 represents that a transmission by access node A 605 would be detectable by UE1 610 at the first time, while cell 666 represents that a transmission by access node A 605 would not be detectable by UE 610 at the second time. Row 668 presents signal measurement information for UE1 610 I.C.O. both access nodes A 605 and B 607. The values of cells of in row 668 are basically a logical AND operation of the values of cells associated with UE1 610 and the individual access nodes.

According to an example embodiment, a UE determines its access strategy and associated access parameters based on signal measurement information. Signal measurement information, such as shown in FIG. 4, may be used to set a transmission probability for a UE, for example. In a situation when transmissions by a UE are not causing interference to an access node when the access node is using a particular communications beam (e.g., when a value associated with the UE/access node/communications beam combination is "0"), the UE may set or select its access strategy to increase the transmission probability. Conversely, when transmissions by the UE are causing interference to the access node when the access node is using a particular communications beam (e.g., when a value associated with the UE/access node/communications beam combination is "1"), the UE may set or select its access strategy to decrease the transmission probability. As an illustrative example, a contention window size is used to set the transmission probability, with smaller contention window sizes increasing the transmission probability and larger contention window sizes decreasing the transmission probability. As another illustrative example, a CSMA listen-before-talk (LBT) threshold is used to set the transmission probability, with larger CSMA LBT thresholds increasing the transmission probability and smaller CSMA LBT thresholds decreasing the transmission probability.

According to an example embodiment, a UE determines its access strategy and associated access parameters based on signal measurement information and communications beam scheduling information. Signal measurement information and communications beam scheduling information (such as shown in FIGS. 5B and 6B) may be used to set a transmission probability for a UE, for example. In a situation when transmissions by a UE are not causing interference to an access node at a time when the access node is using a particular communications beam (e.g., when a value associated with the UE/access node/communications beam combination is "0"), the UE may set its access strategy to increase the transmission probability. Conversely, when transmissions by the UE are causing interference to the access node at a time when the access node is using a particular communications beam (e.g., when a value associated with the UE/access node/communications beam combination is "1"), the UE may set its access strategy to decrease the transmission probability. As an illustrative example, a contention window size is used to set the transmission probability. As another illustrative example, a CSMA LBT threshold is used to set the transmission probability.

According to an example embodiment, in a situation where an access node serves multiple UEs, each of the UEs independently determine its own access strategy and associated access parameters based on signal measurement information. According to an example embodiment, in a situation where an access node serves multiple UEs, each of the UEs independently determine its own access strategy and associated access parameters based on signal measurement information and communications beam scheduling information.

It is noted that in a situation where multiple UEs may simultaneously transmit, a collision may occur and collision resolution is needed. Any of a variety of contention resolution techniques may be used. As an illustrative example, a contention resolution technique involving a random backoff period may be used. As another illustrative example, a contention resolution technique involving a random backoff period and increased contention window size may be used.

Figure 7:
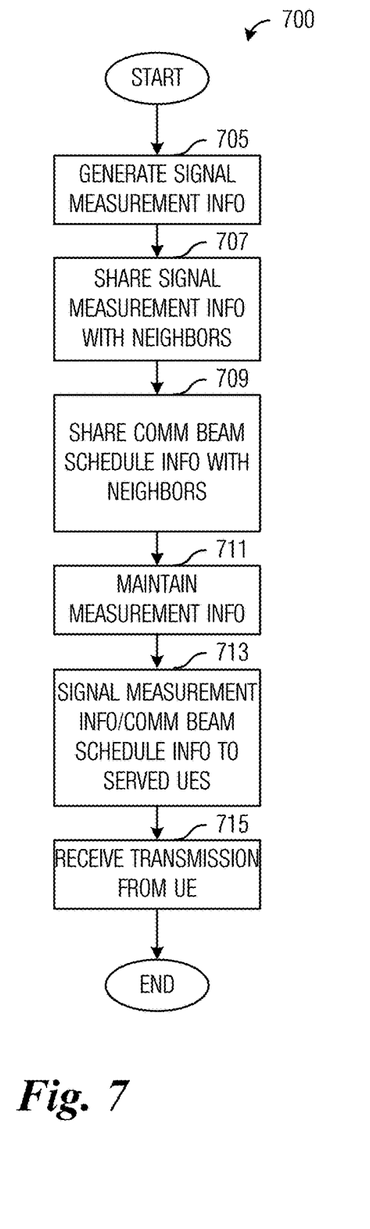
FIG. 7 illustrates a flow diagram of example operations occurring in an access node according to example embodiments described herein.

FIG. 7 illustrates a flow diagram of example operations 700 occurring in an access node. Operations 700 may be indicative of operations occurring in an access node as the access node receives a transmission from a UE.

Operations 700 begin with the access node generating signal measurement information (block 705). The access node may generate the signal measurement information by deriving the signal measurement information from measurement reports received from UEs. Alternatively, the access node may generate the signal measurement information by measuring signals transmitted by UEs and deriving the signal measurement information from the measurements. The signal measurement information may be generated from detected signal levels from the measurement reports received from the UEs or from actual measurements made by the access node. The access node shares the signal measurement information with other access nodes (block 707). The access node shares its signal measurement information with other access nodes. In some embodiments, each UE reports measurement reports that include measurements for more than one access node. In such a situation, the access node provides the measurements for the other access nodes to the other access nodes, in addition to its signal measurement information. The access node shares communications beam schedule information with other access nodes (block 709). The access node shares a schedule of how its communications beams are used to other access nodes. The access node maintains the signal measurement information (block 711). The access node updates the signal measurement information based on the signal measurement information and/or the communications beam scheduling information received from other access nodes. The access node signals the signal measurement information and/or the communications beam scheduling information to the UEs that it serves (block 713). The access node receives an uplink transmission from a UE (block 715). The access node receives an uplink transmission from one of its served UEs.

Figure 8:
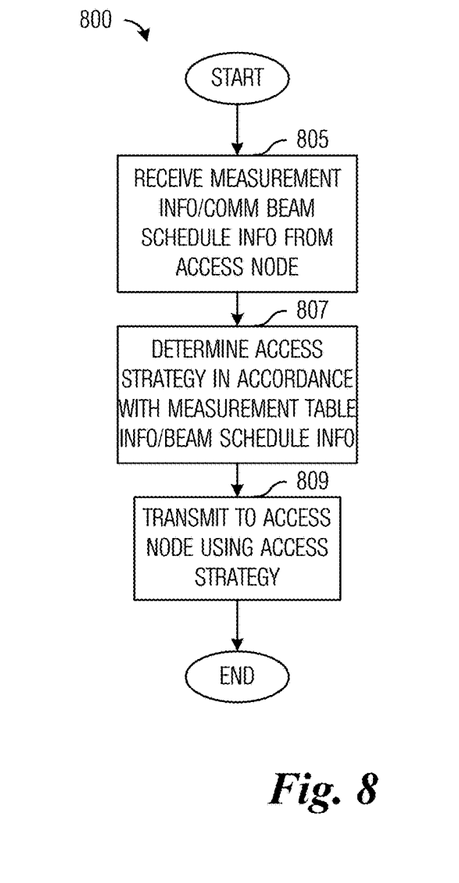
FIG. 8 illustrates a flow diagram of example operations occurring in a UE according to example embodiments described herein.

FIG. 8 illustrates a flow diagram of example operations 800 occurring in a UE. Operations 800 may be indicative of operations occurring in a UE as the UE uses signal measurement information and/or communications beam scheduling information to determine an access strategy and uses the access strategy to transmit a transmission to an access node serving the UE.

Operations 800 being with the UE receiving signal measurement information and/or communications beam scheduling information from the access node serving the UE (block 805). The UE uses the signal measurement information and/or the communications beam scheduling information to determine an access strategy (block 807). In addition to the access strategy, the UE determines associated access parameters of the access strategy. The UE uses the access strategy to transmit a transmission to the access node (block 809).

Figure 9:
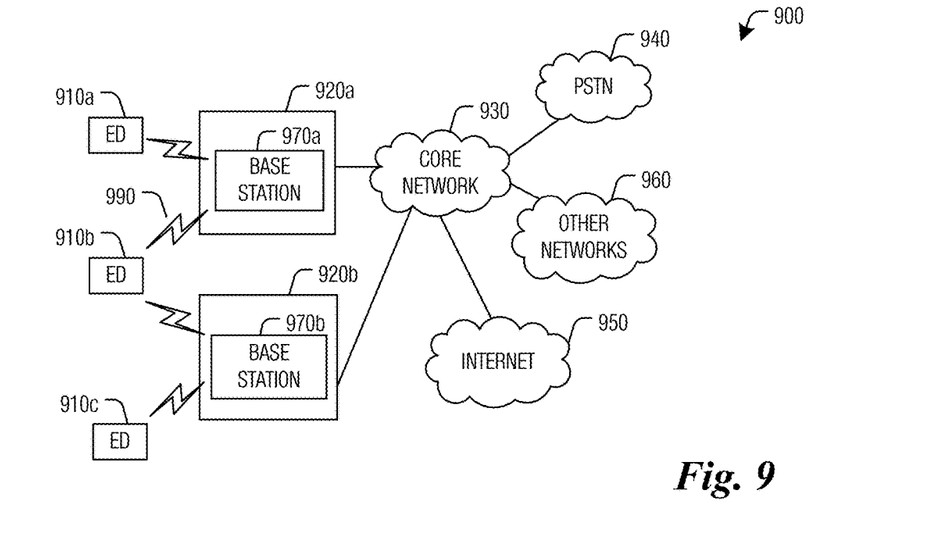
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate and/or communicate in the system 900. For example, the EDs 910a-910c are configured to transmit and/or receive via wireless or wired communication channels. Each ED 910a-910c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, and/or the other networks 960. For example, the base stations 970a-970b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 910a-910c are configured to interface and communicate with the Internet 950 and may access the core network 930, the PSTN 940, and/or the other networks 960.

In the embodiment shown in FIG. 9, the base station 970a forms part of the RAN 920a, which may include other base stations, elements, and/or devices. Also, the base station 970b forms part of the RAN 920b, which may include other base stations, elements, and/or devices. Each base station 970a-970b operates to transmit and/or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b and/or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
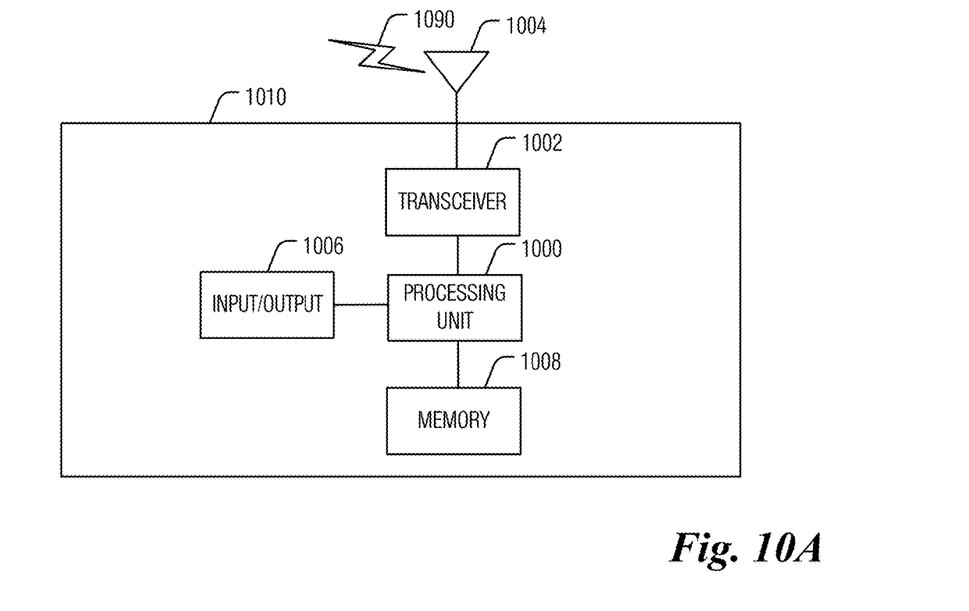
FIGS. 10A and 10B illustrate example devices that may implement the methods and teachings according to this disclosure.
Figure 10B:
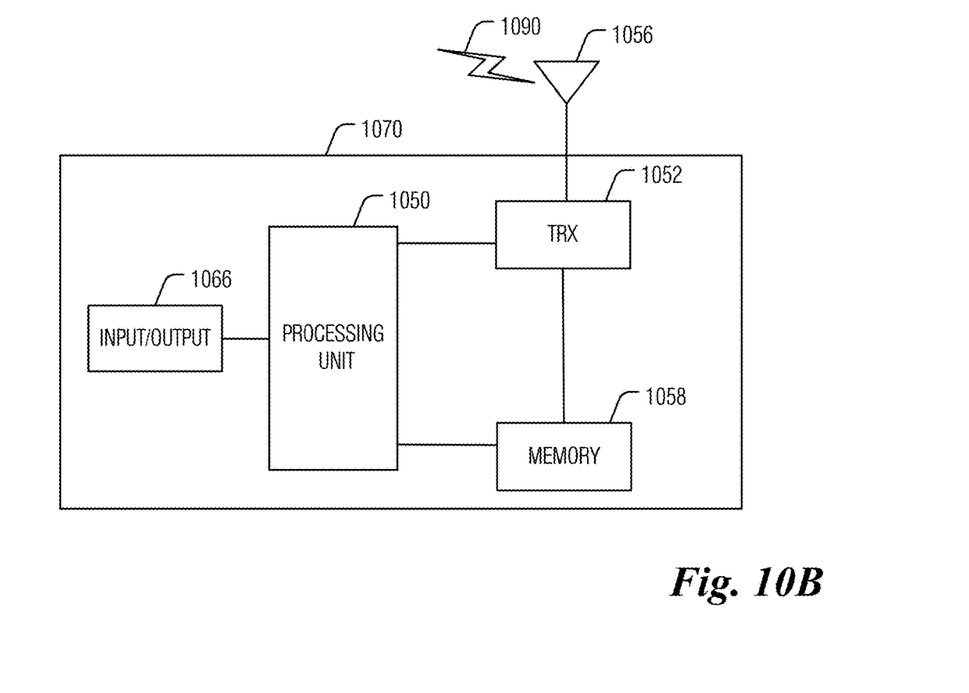

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission and/or processing signals received wirelessly or by wire. Each antenna 1004 includes any suitable structure for transmitting and/or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving/providing information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting and/or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile and/or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
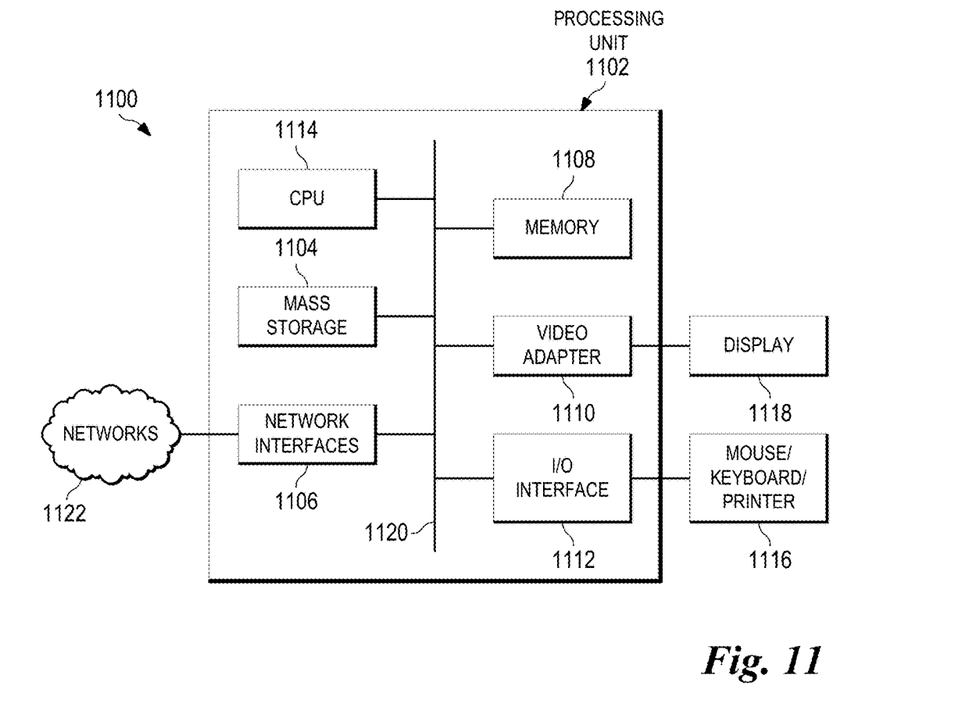
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1404, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse/keyboard/printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, and/or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a signaling unit/module, a deriving unit/module, a measuring unit/module, an updating unit/module, and/or a sharing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for communicating with an access node, the method comprising:
receiving, by a user equipment (UE) from the access node, signal measurement and communications beam scheduling information comprising first signal measurement and communications beam scheduling information of the access node and second signal measurement and communications beam scheduling information of at least one neighboring access node of the access node;
determining, by the UE, an access strategy and an associated access parameter for a random access shared communications channel in accordance with the first signal measurement and communications beam scheduling information of the access node and the second signal measurement and communications beam scheduling information of the at least one neighboring access node; and
transmitting, by the UE, an uplink transmission on the random access shared communications channel in accordance with the associated access parameter after obtaining access to the shared communications channel.

2. The method of claim 1, wherein the signal measurement and communications beam scheduling information includes at least one of indications indicating detectability of communications beams of the access node, or indications indicating detectability of communications beams of the at least one neighboring access node.

3. The method of claim 1, wherein determining the access strategy comprises:
determining, by the UE, a value for the associated access parameter in accordance with a transmission probability.

4. The method of claim 3, wherein the associated access parameter comprises one or more of a listen before talk (LBT) threshold, a contention window size, wait time before contention, or a carrier sense multiple access (CSMA) threshold.

5. The method of claim 1, further comprising:
receiving, by the access node, at least part of the second signal measurement and communications beam scheduling information of the at least one neighboring access node from the at least one neighboring access node; and
updating, by the access node, the signal measurement and communications beam scheduling information in accordance with the at least part of the second signal measurement and communications beam scheduling information of the at least one neighboring access node.

6. A method for communicating with a user equipment (UE), the method comprising:
generating, by an access node, signal measurement and communications beam scheduling information comprising first signal measurement and communications beam scheduling information of the access node and second signal measurement and communications beam scheduling information of at least one neighboring access node of the access node in accordance with channel measurements of beam-formed communications channels between access nodes and UEs served by the access nodes, the access nodes including the access node and the at least one neighboring access node, and the UEs including the UE;
signaling, by the access node to the UE, the signal measurement and communications beam scheduling information comprising first signal measurement and communications beam scheduling information of the access node and second signal measurement and communications beam scheduling information of at least one neighboring access node; and
receiving, by the access node in response to the signaling, an uplink transmission from the UE on a random access shared communications channel.

7. The method of claim 6, wherein generating the signal measurement and communications beam scheduling information comprises deriving, by the access node, the signal measurement and communications beam scheduling information of the access node from measurement reports received from at least part of the UEs served by the access node.

8. The method of claim 6, wherein generating the signal measurement and communications beam scheduling information comprises:
measuring, by the access node, at least part of the communications channels in accordance with signals received from UEs served by the access node; and deriving, by the access node, at least part of the signal measurement and communications beam scheduling information from the measurements of the at least part of the communications channels.

9. The method of claim 6, further comprising sharing, by the access node, at least part of the signal measurement and communications beam scheduling information with the at least one neighboring access node neighboring access nodes.

10. A user equipment (UE) comprising:
a non-transitory memory storage comprising instructions; and
one or more processors in communication with the non-transitory memory storage, wherein the one or more processors execute the instructions to:
receive, from an access node, signal measurement and communications beam scheduling information comprising first signal measurement and communications beam scheduling information of the access node and second signal measurement and communications beam scheduling information of at least one neighboring access node of the access node;
determine an access strategy and an associated access parameter for a random access shared communications channel in accordance with the first signal measurement and communications beam scheduling information of the access node and the second signal measurement and communications beam scheduling information of the at least one neighboring access node; and
transmit an uplink transmission on the random access shared communications channel in accordance with the associated access parameter after obtaining access to the random access shared communications channel.

11. The UE of claim 10, wherein the one or more processors execute the instructions to determine a value for the associated access parameter in accordance with a transmission probability.

12. The UE of claim 10, wherein the signal measurement and communications beam scheduling information includes at least one of indications indicating detectability of communications beams of the access node, or indications indicating detectability of communications beams of the at least one neighboring access node.

13. The UE of claim 10, wherein the signal measurement and communications beam scheduling information comprises signal measurement and communications beam scheduling information of a plurality of time slots, the plurality of time slots corresponding to respective communications beams of the access node and the at least one of the neighboring access node.

14. The UE of claim 10, wherein the signal measurement and communications beam scheduling information comprises a plurality subsets of signal measurement indications of a single UE, the plurality subsets of signal measurement indications corresponding to respective different access nodes comprising the access node and the at least one neighboring node.

15. An access node comprising:
a non-transitory memory storage comprising instructions; and
one or more processors in communication with the non-transitory memory storage, wherein the one or more processors execute the instructions to:
generate signal measurement and communications beam scheduling information comprising first signal measurement and communications beam scheduling information of the access node and second signal measurement and communications beam scheduling information of at least one neighboring access node of the access node in accordance with channel measurements of beam-formed communications channels between access nodes and UEs served by the access nodes, the access nodes including the access node and the at least one neighboring access node, the UEs including the UE;
signal, to the UE, the signal measurement and communications beam scheduling information comprising the first signal measurement and communications beam scheduling information of the access node and the second signal measurement and communications beam scheduling information of at least one neighboring access node; and
receive, from the UE in response to the signaling, an uplink transmission on a random access shared communications channel.

16. The access node of claim 15, wherein the one or more processors execute the instructions to derive the signal measurement and communications beam scheduling information of the access node from measurement reports received from at least part of UEs served by the access node.

17. The access node of claim 15, wherein the one or more processors execute the instructions to measure at least part of the communications channels in accordance with signals received from the at some of the UEs served by the access node, and derive the signal measurement and communications beam scheduling information from measurements of the at least part of the communications channels.

18. The access node of claim 15, wherein the one or more processors execute the instructions to share at least part of the signal measurement and communications beam scheduling information with the at least one neighboring access node.

19. The access node of claim 15, wherein the one or more processors further execute the instructions to receive at least part of the second signal measurement and communications beam scheduling information from the at least one neighboring access node, and update the signal measurement and communications beam scheduling information in accordance with the at least part of the second signal measurement and communications beam scheduling information.

20. The access node of claim 15, wherein the signal measurement and communications beam scheduling information comprises signal measurement and communications beam scheduling information of a plurality of time slots, the plurality of time slots corresponding to respective communications beams of the access node and the at least one of the neighboring access node.

21. The UE of claim 15, wherein the signal measurement and communications beam scheduling information comprises a plurality subsets of signal measurement indications of a single UE, the plurality subsets of signal measurement indications corresponding to respective different access nodes comprising the access node and the at least one neighboring node.

* * * * *

UNITED STATES PATENT AND TRADEMARK OFFICE
CERTIFICATE OF CORRECTION

PATENT NO. : 10,448,417 B2  
APPLICATION NO. : 15/625403  
DATED : October 15, 2019  
INVENTOR(S) : Pengfei Xia

Page 1 of 1

It is certified that error appears in the above-identified patent and that said Letters Patent is hereby corrected as shown below:

In the Claims

Column 19, Line 8, Claim 9, delete "one neighboring access node neighboring access nodes" and insert --one neighboring access node--.

Signed and Sealed this  
Thirtieth Day of June, 2020

Andrei Iancu  
*Director of the United States Patent and Trademark Office*